(12) United States Patent
Battepati et al.

(10) Patent No.: US 11,526,399 B2
(45) Date of Patent: *Dec. 13, 2022

(54) DATA RECOVERY USING BITMAP DATA STRUCTURE

(71) Applicant: Microsoft Technology Licensing, LLC, Redmond, WA (US)

(72) Inventors: Roopesh Battepati, Bellevue, WA (US); Michael C. Johnson, Bothell, WA (US); Manoj Kadam, Redmond, WA (US); Raymond Wang, Kirkland, WA (US); Ganesh Prasad, Bellevue, WA (US); Ziquan Zhu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,963

(22) Filed: Aug. 24, 2021

(65) Prior Publication Data

US 2021/0390019 A1 Dec. 16, 2021

Related U.S. Application Data

(63) Continuation of application No. 14/484,592, filed on Sep. 12, 2014, now Pat. No. 11,144,397.

(51) Int. Cl.
*G06F 11/14* (2006.01)
*G06F 11/20* (2006.01)

(52) U.S. Cl.
CPC ...... *G06F 11/1407* (2013.01); *G06F 11/1451* (2013.01); *G06F 11/2074* (2013.01); *G06F 11/2082* (2013.01); *G06F 2201/84* (2013.01); *G06F 2201/855* (2013.01)

(58) Field of Classification Search
CPC ............ G06F 11/1407; G06F 11/1451; G06F 2201/84
See application file for complete search history.

(56) References Cited

U.S. PATENT DOCUMENTS

| 8,229,896 B1 * | 7/2012 | Narayanan | G06F 11/1469 707/674 |
| 2010/0005259 A1 * | 1/2010 | Prahlad | G06F 11/1435 711/E12.002 |
| 2010/0191884 A1 * | 7/2010 | Holenstein | G06F 11/2094 707/613 |
| 2012/0303581 A1 * | 11/2012 | Calder | G06F 16/27 707/626 |
| 2014/0351533 A1 * | 11/2014 | Brown | G06F 11/1446 711/162 |

* cited by examiner

*Primary Examiner* — Jigar P Patel (57) ABSTRACT

Examples of the present disclosure describe implementing bitmap-based data replication when a primary form of data replication between a source device and a target device cannot be used. According to one example, a temporal identifier may be received from the target device. If the source device determines that the primary replication method is unable to be used to replicate data associated with the temporal identifier, a secondary replication method may be initiated. The secondary replication method may utilize a recovery bitmap identifying data blocks that have changed on the source device since a previous event.

17 Claims, 10 Drawing Sheets

DATA RECOVERY USING BITMAP DATA STRUCTURE

CROSS-REFERENCE TO RELATED APPLICATIONS

This application is a continuation application and claims priority to U.S. patent application Ser. No. 14/484,592 filed on Sep. 12, 2014, which application is incorporated herein by reference in its entirety.

BACKGROUND

Systems may utilize log-based replication for replicating data between a source and target. Updates of a source device may be captured in a log, and the log may be sent to one or more target devices for replication. During operation, a log of a target may lose synchronization with a log of a source. It is with respect to this general technical environment that the present application is directed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Examples of the present disclosure describe implementing bitmap-based replication when synchronization is lost between a source device and a target device. According to one example, a temporal identifier may be received from the target device. If the source device determines that a primary replication method is unable to be used to replicate data associated with the temporal identifier, a secondary replication method may be initiated. The secondary replication method may utilize a recovery bitmap identifying data blocks that have changed on the source device since a previous event.

In one example, a starting log sequence number (LSN) and an ending LSN may be tagged in the recovery bitmap to track replication of the data blocks that have changed on the source device since the previous event. Creation of the recovery bitmap may comprise propagating bitmap data throughout a hierarchical bitmap structure maintained on behalf of the target device. The recovery bitmap may comprise an accumulation of data indicated by the hierarchical bitmap structure. In addition to the recovery bitmap, the hierarchical bitmap structure may include a checkpoint bitmap corresponding to data records in a current virtual log file, and an accumulating bitmap corresponding to data records in multiple log files. Data may be propagated from the checkpoint bitmap to the accumulating bitmap when a current log file represented by the checkpoint bitmap is full. Data may be propagated from the accumulating bitmap to the recovery bitmap upon determining that the primary replication method is unable to be used to replicate data associated with the temporal identifier. The initiation of the secondary replication method may further include sending the recovery bitmap to the target device.

In one example, the primary replication method is a log-based replication method, the temporal identifier is an LSN, and the previous event is a previous replication of data to the target device through a transaction indicated by the most recent previously received LSN. Further, the recovery bitmap may identify a LSN corresponding to a most recent data change represented by the recovery bitmap. That is, the source device may receive a second LSN from the target device. Based on receipt of the second LSN, the source device may determine if the accumulating bitmap for the target device is empty. When the accumulating bitmap for the target device is empty, the source device may provide replication data to the target device using a primary replication method such as log-based replication. When the accumulating bitmap for the target is not empty, data may be propagated from the accumulating bitmap to the recovery bitmap to be sent from the recovery bitmap to the target device.

In addition to examples where the source device manages replication data for a single target device, the source device may manage replication of data to a plurality of target devices. The source device may create and maintain a separate recovery bitmap for each of the plurality of target devices.

In an example where a data change occurs on the source device, a new bit in the recovery bitmap may be set when a new update is made on the source device. As an example, the new bit may equate to a range of storage of the source device in which the change has occurred.

Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Examples of the present disclosure describe implementing a secondary replication method that utilizes bitmap data structures when synchronization is lost between a source device and a target device.

Replication systems share log records identified by log sequence numbers LSNs with other replication systems as a part of a replication protocol with the goal of synchronizing source and target data stores. When applications issue updates to data stores, a replication system synchronously records the updates to the replication log and satisfies the application request. The updates to the data store itself may be applied from the replication log when it is convenient for device to process the updates.

Logging exists to ensure that if a crash occurs, a committed transaction will be correctly reflected in a data store after the crash. It ensures that an uncommitted transaction will be correctly rolled back and not reflected in the data store after the crash. The LSN of a log record is used for constructing the correct restore sequences during a recovery protocol enforced by the replication systems. Log Sequence numbers can be compared when constructing restore sequences in recovery protocols. Further, replication using logs permits a target device to maintain synchronization without requiring large amounts of data to be transmitted to the target device. Rather, upon initialization, the target device receives a full replication of the source device's data store, and thereafter the source device keeps a log of any transactions that affect the source device data store. The log of the transactions is periodically sent to the target device so that such transactions can be replayed at the target device data store to keep the two data stores in synchronization.

Virtual log files (VLFs) may be used to aid internal management of a replication log. When a VLF becomes full, logging automatically proceeds to use the next VLF in the replication log. However, once the last VLF is filled, the log "wraps" and begins overwriting log data in a first VLF. Thus, the replication log may be implemented as a circular file.

A target device may lose synchronization with a source device or may be unable to consume log records at the same rate at which the source device is applying log records at the source data store. This may occur for a number of reasons including communication failures, temporary machine outages, etc. In some cases, it may be desired that a source device should continue accepting data transaction requests while target device attempts to catch up. In cases where a target data store is unable to communicate with a source data store for an extended period of time or is unable to consume log records at the same rate at which the source data store is creating new records, there is a chance that a log wrap can occur. That is, when logging reaches the end of a log, it wraps around to start again and begins overwriting what was there before. Once that happens, the log is no longer usable by a target data store to regain synchronization with the source data store.

A target device may attempt to replicate data through a log, but if the target is so far out of sync that a log wrap has occurred, the target device may not be able to replicate using the log files. In the past, the target data store may have needed to replicate the entire source data store, which is an inefficient use of bandwidth and processing. Accordingly, examples of the present disclosure relate to a data replication methods and systems that utilize bitmaps to replicate data that is no longer replicable by a log-based recovery method.

Parallel to maintaining log files, the replication system at a source data store may maintain an in-memory bitmap to track disk blocks that have been written to when the log records are applied to the source data store. The in-memory bitmap may maintain all changes to data on a source data store that have occurred since a previous event such as a log checkpoint. The source device may propagate data from this global bitmap to target-specific bitmaps maintained on the source device. Using a separate hierarchical bitmap structure for each target data store allows for multiple target devices to synchronize with the source device independently from other target devices. That is, data from the source data store may continue to be replicated to certain target devices using a log-based replication, while the same source data may replicate data to other target devices using one or more hierarchical bitmap structure(s).

Figure 1A:
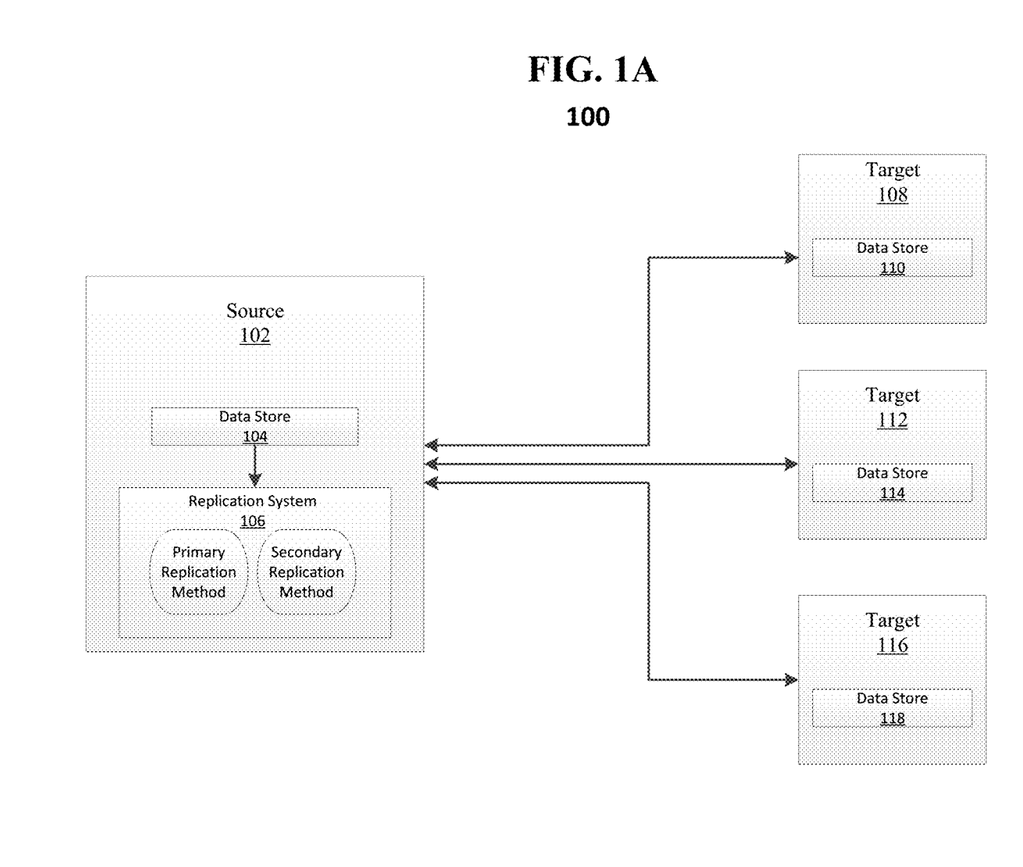
FIG. 1A illustrates an overview of a system that may be used to implement examples described herein.

FIG. 1A illustrates an overview of a system 100 that may be used to implement examples described herein. FIG. 1A illustrates an interaction that may occur between a source 102 and its associated data store 104 and multiple targets (e.g., 108, 112, 116) and their respective data stores 110, 114 and 118. The source 102 may include a replication system 106 that is operatively connected with the source data store 104. The replication system 106 may comprise a software application that operates on the source 102 (which may be a computing device) to keep the source data store 104 and the target data stores 110, 114 and 118 synchronized. As an example, the replication system 106 may implement a primary replication method, for example, log-based replication and a secondary replication method, as appropriate. The replication system 106 may switch between the primary replication method and the secondary replication method. For instance, the source 102 may receive a query from a target 108 for log data including an LSN that provides an indication of the most recent synchronization of the target 108. The source may determine whether synchronization for the target device 108 can be achieved through using the primary replication method. For example, if a log on the data store 104 of the source 102 is unable to be used to replicate one or more necessary records, the replication system 106 of the source 102 may switch to the secondary replication method. From there, data can be transmitted to the target 108 to regain synchronization with the source 102. As explained herein, the secondary replication method may comprise a bitmap-based replication method.

In another example, multiple targets including target 108, target 112 and target 116 may query the source 102 for synchronization of data. The source 102 may be capable to run both the primary replication method and the secondary replication method in parallel, when responding to different queries. For example, target 108 may be substantially synchronized with source 102, so log-based replication is still usable with target 108. By contrast, target 112 may have experienced a lengthy failure and, in the interim, a log wrap affecting log data needed by target 112 may have occurred, in which case source 102 may switch to a bitmap-based replication procedure for target 112. Targets 108, 112 and 116, like the source 102, may be configurable to implement both log-based replication and bitmap-based replication for log resynchronization.

Figure 1B:
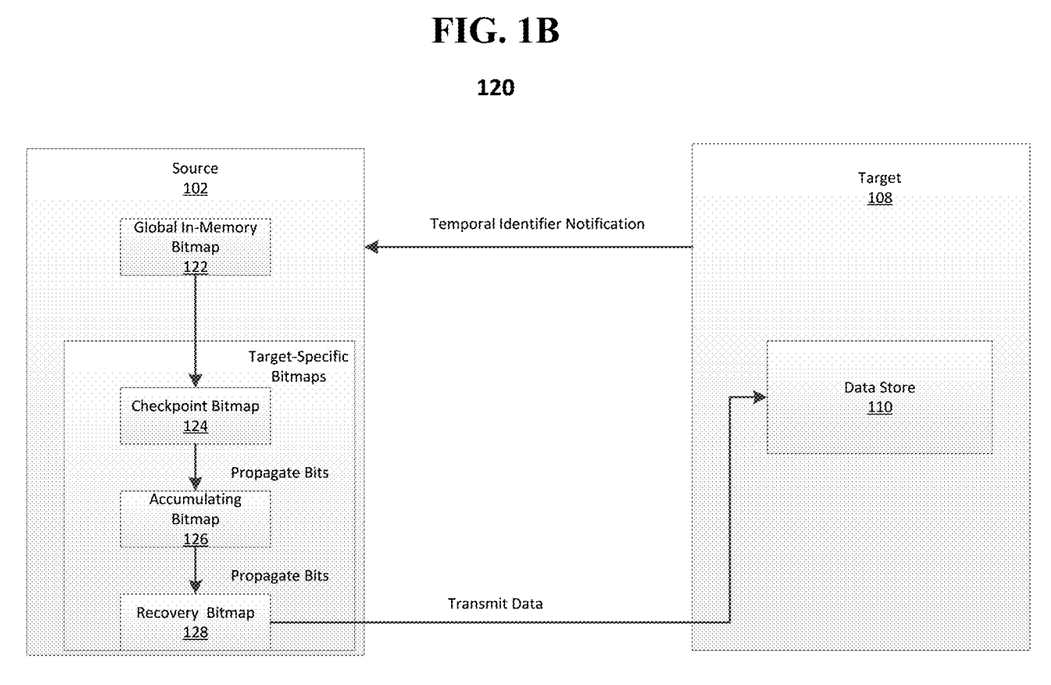
FIG. 1B illustrates an overview of a system including a source and a target, which may be used to implement examples described herein.

FIG. 1B illustrates an overview of a system 120 including a source 102 and a target 108, which may be used to implement examples described herein. The source 102 and the target 108 may be connected in a network to perform any type of replication. In another example, the source 102 may be connected with a plurality of targets 108, 112 and 116 as shown in FIG. 1A. Disk storage replication may be performed between the source 102 and the target 108, including, for example, synchronous replication or asynchronous replication. Replication may be achieved through an implementation of software built into an operating system running on a device having a processor.

With reference to FIG. 1B, the target 108 may notify the source 102 of a temporal identifier such as an LSN. The temporal identifier indicates a point in time up to which replication requests have been processed on the target 108. In an example where log-based replication is being used by the replication system 106, the temporal identifier may be an LSN. The target 108 may notify the source 102 of an LSN.

This allows the source 102 to identify a point up to which the target 108 has replicated source data. If the target 108 is too far behind for log-based replication to be effective (e.g., a log wrap affecting data needed by target 108 has occurred), then the replication system 106 of the source 102 may switch to a secondary replication method to send the target 108 data for replication.

In that regard, the source 102 may maintain a global in-memory bitmap 122 that is used to indicate pieces of data that have changed on the source data store 104 since a previous event has been recorded. In one example, the previous event may be a log checkpoint, and the global in-memory bitmap 122 will detail all ranges of a disk that have been changed by any transactions since the previous log checkpoint. Each bit of the global in-memory bitmap 122 may be set to equate to a certain range of disk in which a data change has occurred on the data store 104 of the source 102. As an example, one bit may equate to 256K of source disk. In that example, if any portion of that 256K of source disk has been changed since the previous event, the bit corresponding to that 256K portion of the source disk is set in the bitmap (e.g., changed from zero to one) to indicate a change in that portion of the source disk. However, mapping of a bit of the global in-memory bitmap 122 is discretionary and may be changed. For example, making each bit correspond to a smaller section of source disk increases accuracy, but also increases the size of the bitmap that must be maintained.

When a new replication partner is created, e.g. target 108, the source 102 may store a persistent set of bitmaps on behalf of the target 108. This set of bitmaps may be used to track bitmap data for the target 108 in the case where the target 108 needs to replicate data through a bitmap-based recovery method. In one example, the target-specific bitmaps may include a checkpoint bitmap 124, an accumulating bitmap 126 and a recovery bitmap 128 as shown in FIG. 1B.

When a new checkpoint is recorded on the source 102, the replication system 106 propagates bitmap data of the global in-memory bitmap 122 to the target-specific bitmaps in case the target 108 needs to replicate data through bitmap-based replication. At that point, the in-memory bitmap 122 may be reset. This process is performed for all the targets to which the source 102 is replicating (e.g., targets 108, 112, and 118 in the example shown in FIG. 1A), as the source 102 would maintain the target-specific bitmaps for each such target. As noted above, persisting the set of target-specific bitmaps on a disk of the source 102, allows for independent lifetimes and synchronization protocols independent of other target devices.

The global in-memory bitmap 122 tags a starting LSN and an ending LSN of a log checkpoint. When a new checkpoint is written on the source data store 104, the source 102 may propagate bitmap data from the global in-memory bitmap 122 to each checkpoint bitmap 124. As an example, the in-memory bitmap 122 is, e.g., OR-ed (logical OR) with the checkpoint bitmap 124 to propagate bitmap data. In transmitting bits of the bitmap to the checkpoint bitmap 124, bits may be tagged with the LSN identified by the previous checkpoint and the ending LSN in the global in-memory bitmap 122. The beginning and ending LSN's of the in-memory bitmap 122 are sent to the checkpoint bitmap 124 upon propagating the in-memory bitmap 122 to the checkpoint bitmap 124. The checkpoint bitmap 124 represents a set of disk blocks corresponding to data records of a virtual log that may be represented by multiple files. As such, the checkpoint bitmap 124 may comprise a compilation of the disk blocks of the source 102 that are affected by transactions represented in the current virtual log. As the log-based replication is operating in parallel, changes to the source data continue to be added to the current virtual log until the current virtual log is full. Once the current virtual log is full, the checkpoint bitmap 124 is propagated to (e.g., OR' ed with) the accumulating bitmap 126.

When the checkpoint bitmap 124 is propagated to the accumulating bitmap 126, the metadata for the accumulating bitmap is adjusted to reflect a new "ending" LSN to equal the last LSN reflected by the checkpoint bitmap 124 that is being propagated to the accumulating bitmap. Further, upon propagation to the accumulating bitmap 126, and the checkpoint bitmap 124 is cleared. In examples, the checkpoint bitmap 124 for a particular target may also be cleared whenever that target successfully replicates data using log-based replication (since the data changes reflected in the checkpoint bitmap 124 would already be reflected in the logs provided by log-based replication). When a new virtual log is added, the checkpoint bitmap 124 LSN points to a first record in the new virtual log file (n+1).

The accumulating bitmap 126 represents a cumulative set of disk blocks corresponding to data records affected by previous virtual log files that have not yet been copied to the data store 110 of the target 108. For example, the accumulating bitmap 126 may represent source disk blocks that are affected by multiple virtual logs (as each time a new virtual log is created, the checkpoint bitmap 124 is, e.g., OR-ed (logical OR) with the accumulating bitmap 126). Metadata associated with the accumulating bitmap 126 also tracks the LSN's represented by the accumulating bitmap 126.

When the source 102 receives a temporal identifier from the target 108 and determines that bitmap based replication is needed to replicate data, the source 102 may propagate data from the accumulating bitmap 126 to the recovery bitmap 128. That is, when a request is made to send data for replication, and the log files cannot be used to fully complete the replication, data may be propagated from the accumulating bitmap 126 to the recovery bitmap 128. The accumulating bitmap 126 is reset when data is propagated to the recovery bitmap 128. In examples, the accumulating bitmap 126 for target 108 may be whenever target 108 successfully replicates data using log-based replication (since the data changes reflected in the accumulating bitmap 126 would already be reflected in the logs provided by log-based replication). In propagating data between the accumulating bitmap 126 and the recovery bitmap 128, the accumulating bitmap 126 is, e.g., OR-ed (logical OR) with the recovery bitmap 128. That is, propagating of the data includes copying data from the accumulating bitmap 126 to the recovery bitmap 128.

From that point, the recovery bitmap 128 may be transmitted to the target 108 to permit replication. The target 108 may then request source 102 to send target 108 all data in the portions of the source data store 104 indicated by the recovery bitmap 128. For example, target 108 may execute a read of the affected portions of disk of source 102. The recovery bitmap 128 may be reset when the recovery bitmap is transmitted to the target 108. The target 108 may also receive metadata indicating the latest LSN that is reflected in the received recovery bitmap 128. The target 108 can then use the latest LSN of the recovery bitmap to provide indications going forward of the extent to which the target 108 is up to date in replication.

The target 108 may continue to send replication requests to the source 102. The source 102 may receive such requests including another temporal identifier (e.g., the last LSN represented by the previously received recovery bitmap 128) and reset the accumulating bitmap 126. The new temporal identifier may indicate a point up to which the target 108 is synchronized (including after consuming the data indicated by the recovery bitmap 128). If bitmap-based replication is still needed to synchronize the source 102 with the target 108 (e.g., if the accumulating bitmap for the target 108 is not empty), the source 102 may continue to propagate bitmap data to the target 108. Alternatively, if the temporal identifier of the renewed request for replication indicates that the target 108 is sufficiently up to date, the replication system 106 may switch back to using a log-based replication method for target 108.

Figure 2:
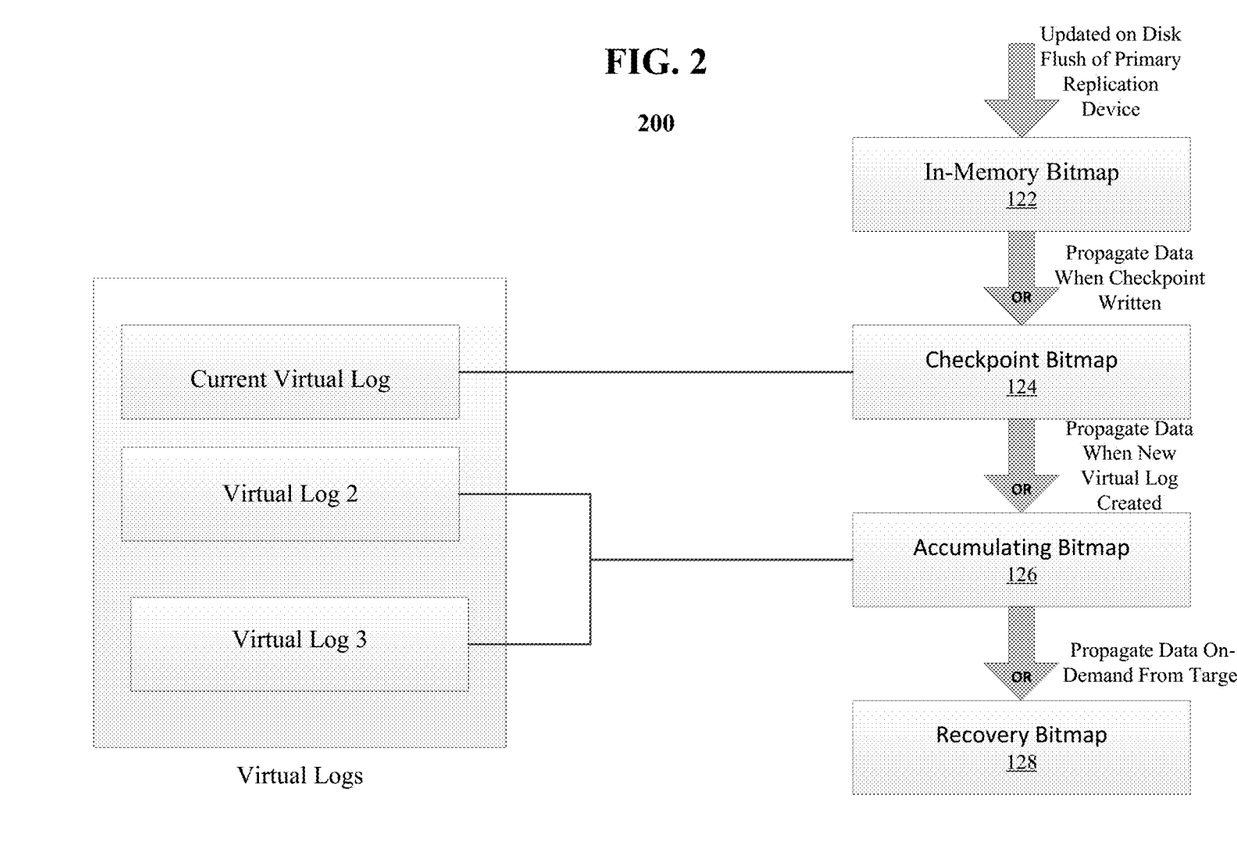
FIG. 2 illustrates a process diagram for propagating data in a hierarchical bitmap structure as described herein.

FIG. 2 illustrates a process 200 for propagating data in a hierarchical bitmap structure as described herein. Examples of hierarchical bitmap structure may include the checkpoint bitmap 124, the accumulating bitmap 126 and the recovery bitmap 128 as described with reference to FIG. 1B. That is, the source 102 may propagate bitmap data from the global in-memory bitmap 122 through to the hierarchical target-specific bitmap structure. Refer to the description of FIG. 1B above, for details regarding each bitmap and the processing flow within the hierarchical bitmap structure.

With reference to FIG. 2, a process 200 for creating a hierarchical bitmap structure is provided. In examples, when a new replication partnership is created (e.g., a new target is configured to replicate a source, such as source 102), the replication system 106 at a source data store 104 starts process 200. The source data store 104 may create a persistent set of bitmaps comprising the checkpoint bitmap 124, the accumulating bitmap 126, and the recovery bitmap 128 for the new partner (e.g., target 108). As shown in FIG. 2, the bitmaps logically track the structure of virtual log files. For example, the checkpoint bitmap 124 tracks the portions of the source data affected by the current virtual log. The accumulating bitmap 126 tracks the portions of the source data affected by previous virtual logs that have been completed since the last update for a relevant target. The recovery bitmap 128 represents a snapshot of changed source data portions between the target's last synchronization update and its current synchronization request. This allows the in-memory bitmap 122, checkpoint bitmap 124 and accumulating bitmap 126 to continue to capture source data changes while the changes indicated by the recovery bitmap 128 continue to be consumed by the target 108.

In examples, an initial value for each of the checkpoint bitmap 124 and the accumulating bitmap 126 is set to all zeros while an initial value for the Recovery Bitmap 128 is set to all "ones." This enables a target 108 to be able to perform an initial full data copy of the entire data store as a part of its recovery protocol. While a target is in the process of copying data store blocks indicated by the recovery bitmap 128, the source data store 104 can undergo modifications that are, in turn, recorded by the set of bitmaps as described above. This enables the source 102 to continue to process data while the target 108 is regaining synchronization through data replication. As described above, bitmap data can be propagated from the in-memory bitmap 122 through the set of target-specific bitmaps including the checkpoint bitmap 124, the accumulating bitmap 126, and the recovery bitmap 128. After the recovery bitmap 128 is consumed completely, a target may request a further replication update, at which point the replication system 106 of the source 102 checks whether the accumulating bitmap is empty. If not, it copies the accumulating bitmap 126 to the recovery bitmap 128 and clears the accumulating bitmap 126. Process 200 may be repeated until the recovery bitmap 128 is empty or until log-based replication may again be resumed.

The following table summarizes an example of the triggers for propagating data for bitmap-based replication described in at least FIGS. 1B and 2:

| Propagate Data From: | Trigger for Propagation |
| --- | --- |
| In-Memory Bitmap 122 to Checkpoint Bitmap 124 | Checkpoint Record Written |
| Checkpoint Bitmap 124 to Accumulating Bitmap 126 | End of Virtual Log |
| Accumulating Bitmap 126 to Recovery Bitmap 128 | Request from Target that Cannot be Completed with Log Files |

The following table summarizes an example of the triggers for resetting of bitmaps described in at least FIGS. 1B and 2:

| Reset of: | Trigger for Reset |
| --- | --- |
| In-Memory Bitmap 122 | Checkpoint Record Written |
| Checkpoint Bitmap 124 | Propagation of data to accumulating bitmap 126 or log request satisfied for target. |
| Accumulating Bitmap 126 | Propagate data to recovery bitmap 128 or log request satisfied for target. |
| Recovery Bitmap 128 | Send data of recovery bitmap 128 to target device. |

Figure 3A:
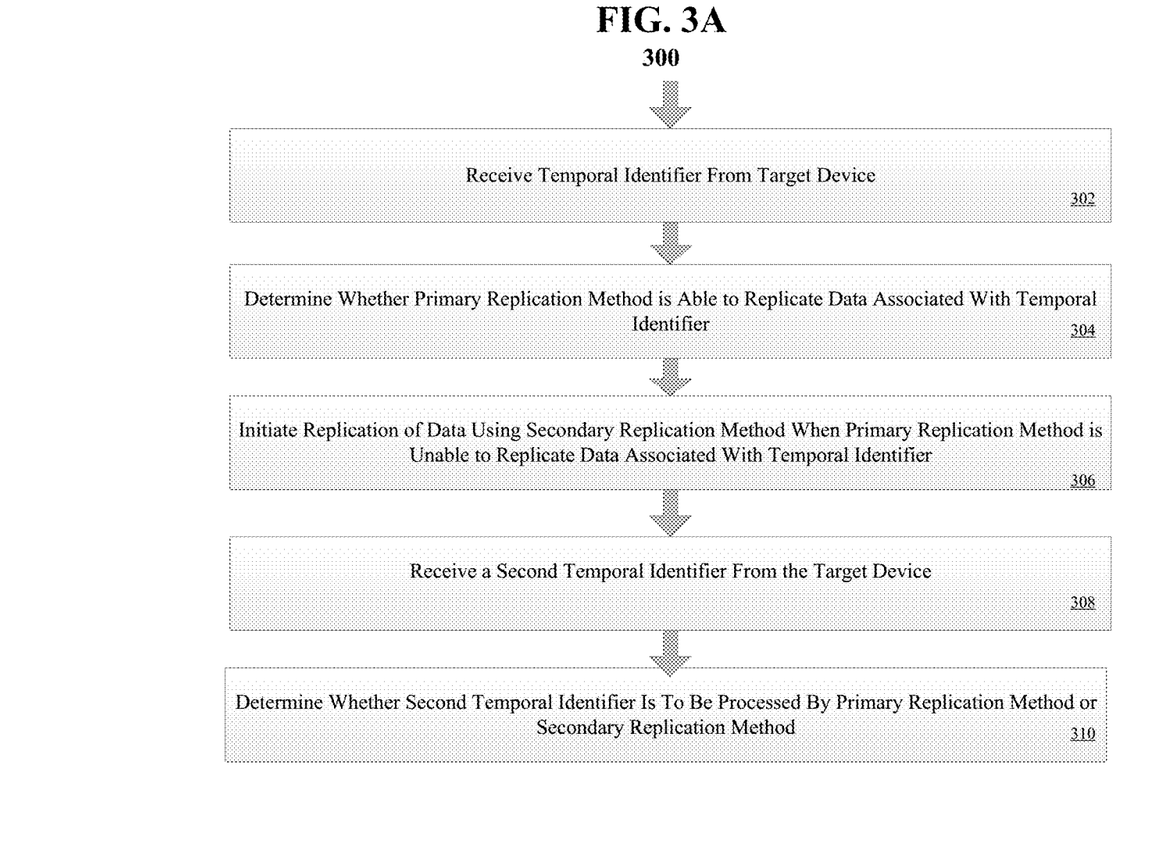
FIG. 3A illustrates an operational flow for processing a request using a secondary replication method as described herein.

FIG. 3A illustrates an operational flow 300 for processing a request using a secondary replication method as described herein. Starting at operation 302, a source (e.g., source 102) may receive a temporal identifier from a target (e.g., target 108). As an example, the temporal identifier may be an LSN.

Proceeding from operation 302 to operation 304, it may be determined whether a primary replication method (e.g., implementing a log-based replication method) is able to replicate data associated with the temporal identifier. If the primary replication system is able to replicate data associated with the temporal identifier, the primary replication method is implemented to transmit replication data to the target 108.

If the primary replication method is unable to replicate the data, flow 300 turns to operation 306 where replication of data may be initiated using the secondary replication method (e.g., implementing a bitmap-based replication method). When data replication is completed, the target 108 may send a second temporal identifier (e.g., a second LSN) to the source 102 to indicate the LSN up to which the target has now replicated.

Moving to operation 308, the second temporal identifier (e.g., LSN) may be received from the target. From there, it may be determined (at operation 310) whether the second request can be processed using the primary replication method or the secondary replication method (operation 310). The appropriate replication method may then be used to enable the target 108 to replicate data.

Figure 3B:
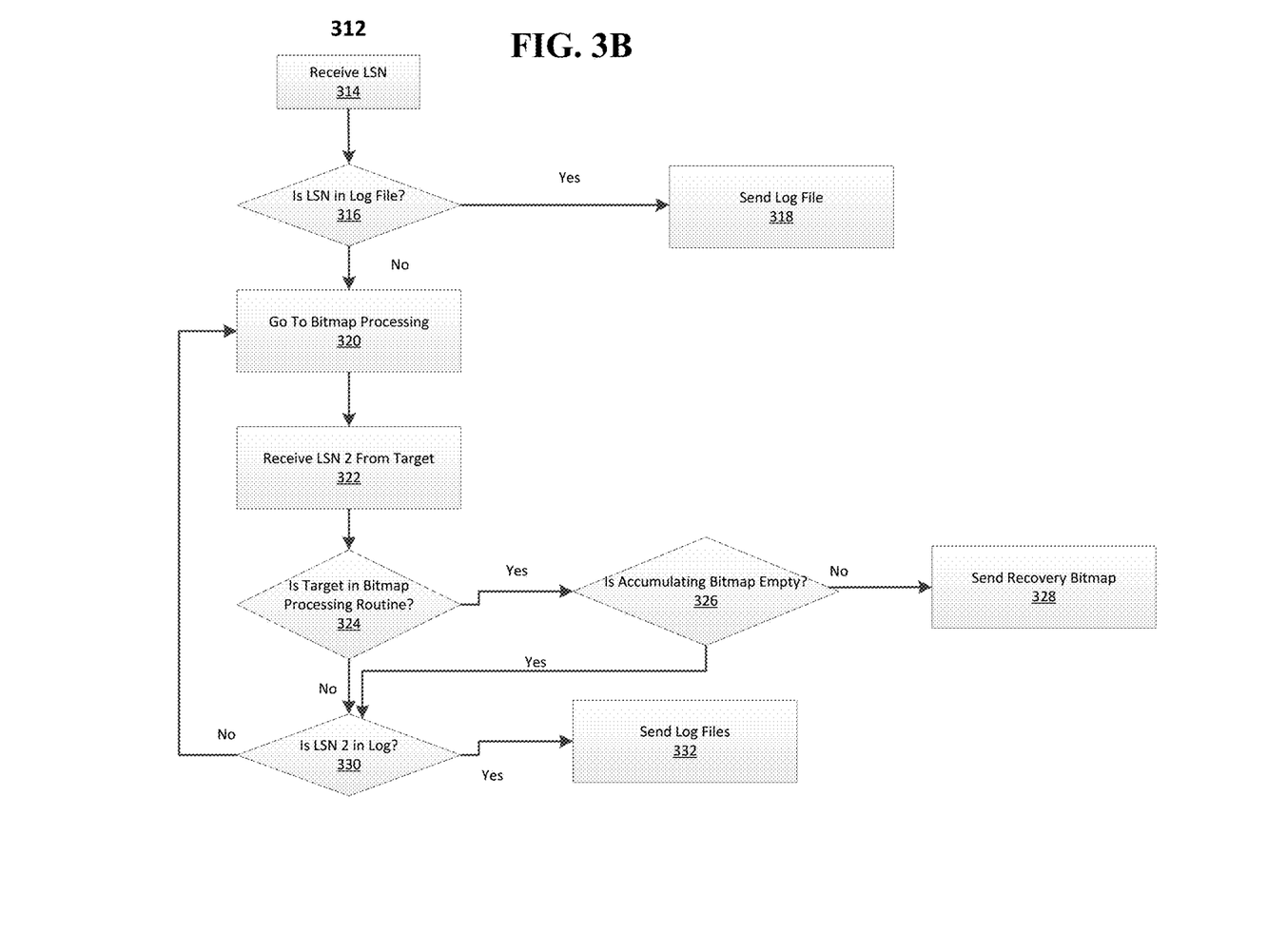
FIG. 3B illustrates an operational flow for processing of requests including Log Sequence Numbers (LSNs) as described herein.

FIG. 3B illustrates an operational flow 312 for replication processing using a primary log-based replication method and a secondary bitmap recovery method. In examples, operational flow 312 may be performed by a source device, such as source 102. Flow 312 starts at operation 314, where an LSN may be received from a target (e.g., target 108). The LSN may be included in a data replication request.

Flow 312 proceeds to decision 316, where it is determined whether the replication of the LSN is able to be processed using a log-based replication method or if bitmap-based processing needs to be implemented to replicate the data. For example, the source may determine whether the request can be satisfied by log-based replication by evaluating the LSN. If replication is possible using log files, at least one log file is sent (operation 318) to implement log-based replication. If the LSN indicates replication is unable to be performed using the log files, bitmap-based processing may be used to replicate the data (operation 320).

Once replication has been completed using the bitmap-based processing (e.g., a recovery bitmap has been sent to and consumed by the target), a second LSN may be received (operation 322) from the target indicating a point up to which the target has replicated the source. The second LSN may be received as part of a second replication request. Flow 312 may proceed to decision 324, where it is determined whether the target is engaged in a bitmap-processing routine (operation 324). For example, the source may determine whether the last replication to that target was a bitmap-based replication. If the target is engaged in a bitmap processing routine, it is determined whether the accumulating bitmap for that target is empty (decision 326). If the accumulating bitmap is not empty, the accumulating bitmap is propagated to the recovery bitmap (as described above) and the recovery bitmap is sent to the target 108 for replication (operation 328).

In a case where the accumulating bitmap 126 is determined to be empty (e.g., at decision 326), or when it is determined that the target is not engaged in the bitmap processing routine (e.g., at decision 324), it is determined whether the second LSN is replicable from log data (decision 330). If the second LSN is replicable using at least one log file, flow 312 proceeds to operation 332 where log file(s) are sent to the target to satisfy the replication request through the primary, log-based replication method. However, at decision 330, if the second LSN indicates log-based replication is not usable, flow 312 returns to operation 320, where bitmap processing is used to replicate data to transmit to the target 108.

The process of receiving and evaluating LSNs sent by the target may continue to allow the target to maintain synchronization with the source or regain synchronization if synchronization is lost between the source and the target.

Figure 4:
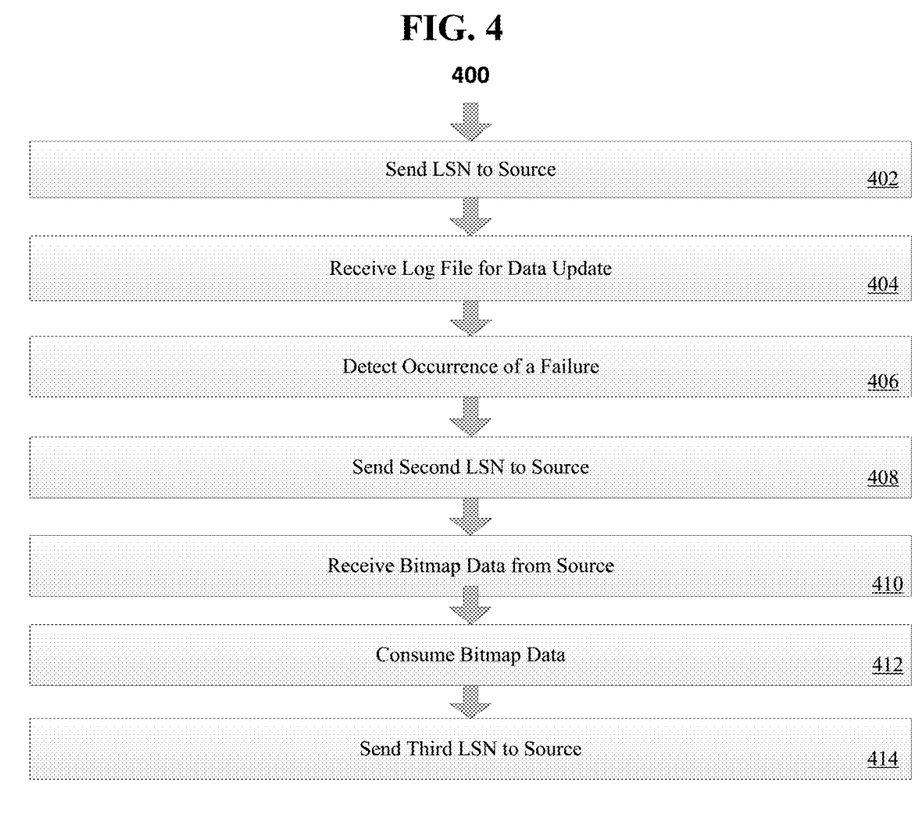
FIG. 4 is an operational flow for data replication on a target device.

FIG. 4 is an operational flow 400 for data replication on a target device such as target 108, 116 or 116 of FIG. 1A. Flow 400 begins at operation 402 when a log sequence number (LSN) is sent to a source (e.g., source 102). The source may determine whether data replication cannot be performed using a log-based replication method. In a case where the source that the log-based replication method can replicate data associated with the LSN, the source may send at least one log file to the target device for replication processing. Moving to operation 404, log data from the source to permit the target to perform replication processing.

Over time, the target device may receive numerous transmissions of log data to maintain synchronization. However, synchronization may eventually be lost. Turning to operation 406, the target may detect an occurrence of a failure. The failure can be of any type including network connection or hardware failures. If the failure persists for a long enough period of time, the target will likely lose synchronization with the source.

After the target recovers from a failure, another LSN may be sent (operation 408) to the source in order to regain replication synchronization. If the source is unable to fully recover data from log files, the source may initiate replication processing via bitmap-based replication. The source may propagate bitmap data to a target-specific hierarchical bitmap structure which includes a recovery bitmap (such as the recovery bitmap 128). Once the bitmap data is propagated through the target-specific hierarchical bitmap structure, data of the recovery bitmap may be received (410) for replication processing.

The bitmap data may then be consumed (operation 412) and replication processing may be performed. For example, the target may request that the source copy to the target all of the data in the source disk sections indicated by the bitmap data. After the replication processing is performed, a third LSN (operation 414) may be sent to the source. The third LSN may be provided as part of an updated replication request. In examples, the third LSN is equal to the LSN indicated in the received bitmap data as the most-recent LSN represented by the bitmap data. Replication of data may continue using one of log-based replication or bitmap-based replication until the target is synchronized with the source.

Figure 5:
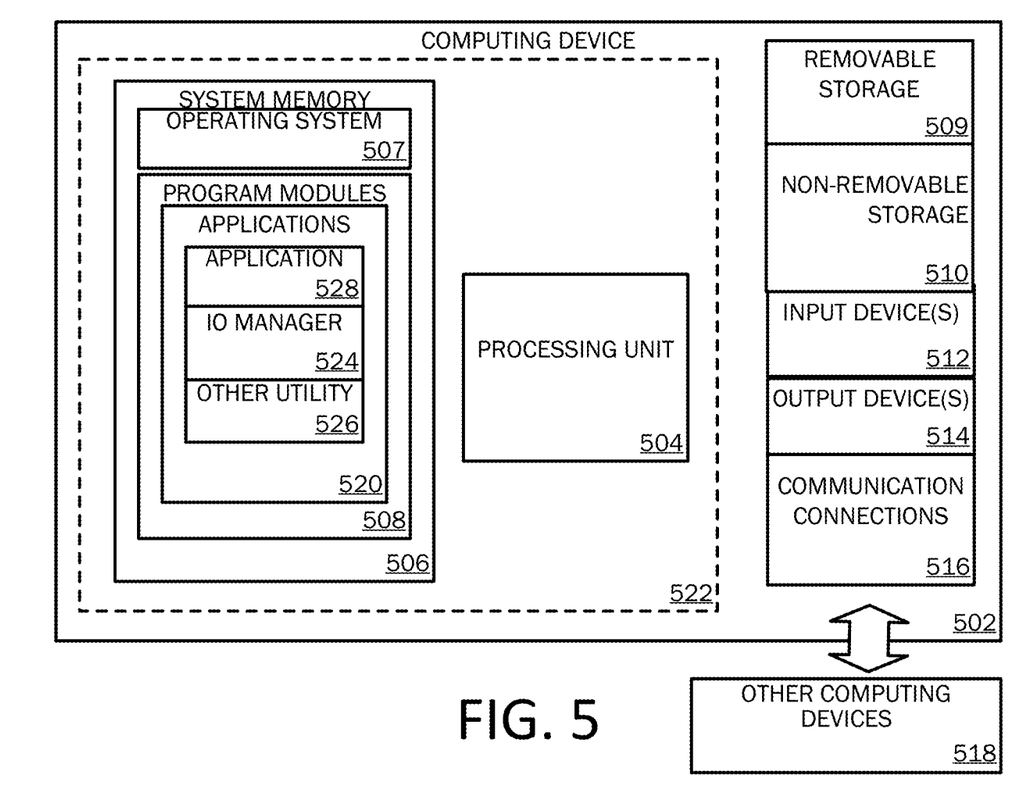
FIG. 5 is a block diagram illustrating an example of a computing device with which aspects of the present disclosure may be practiced.
Figure 6A:
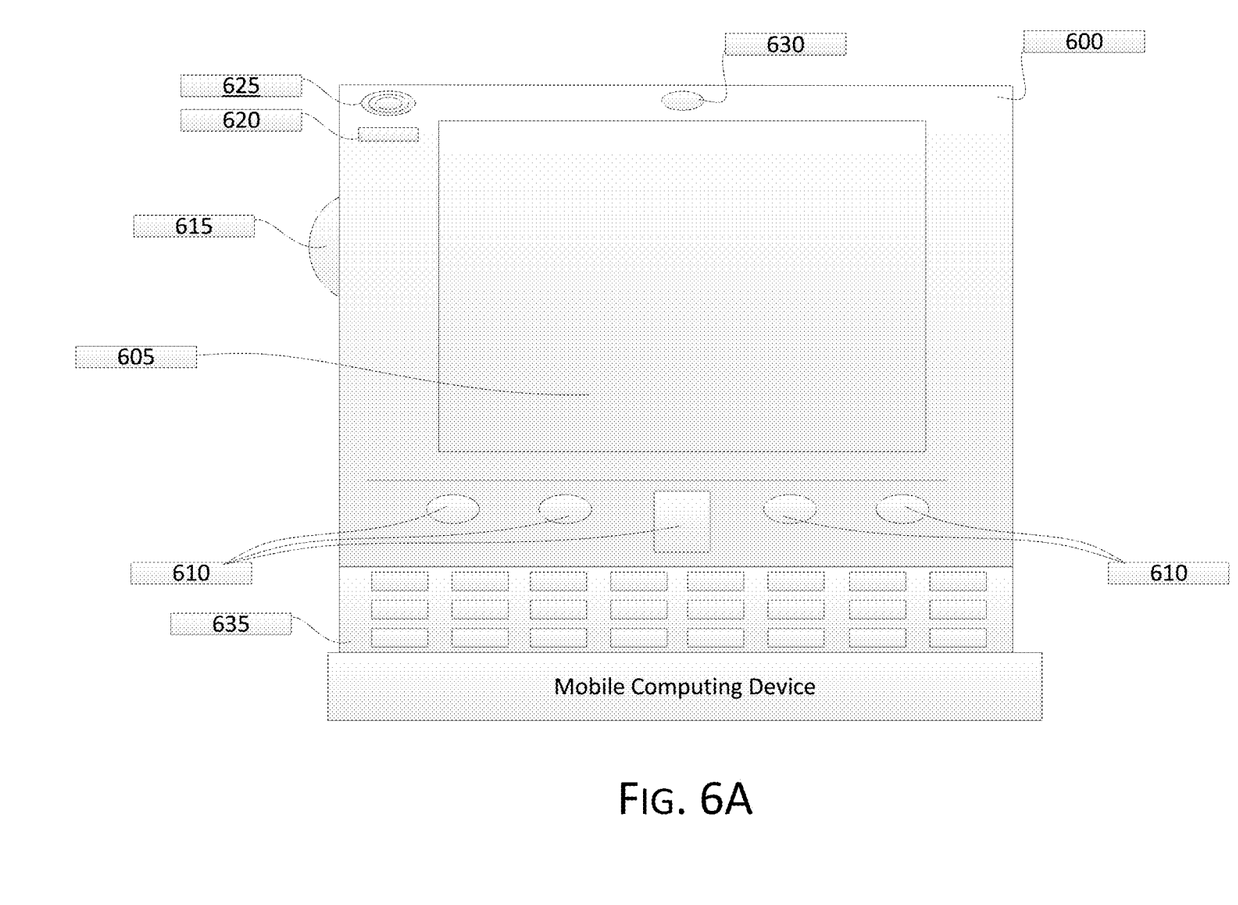
FIGS. 6A and 6B are simplified block diagrams of a mobile computing device with which aspects of the present disclosure may be practiced.
Figure 6B:
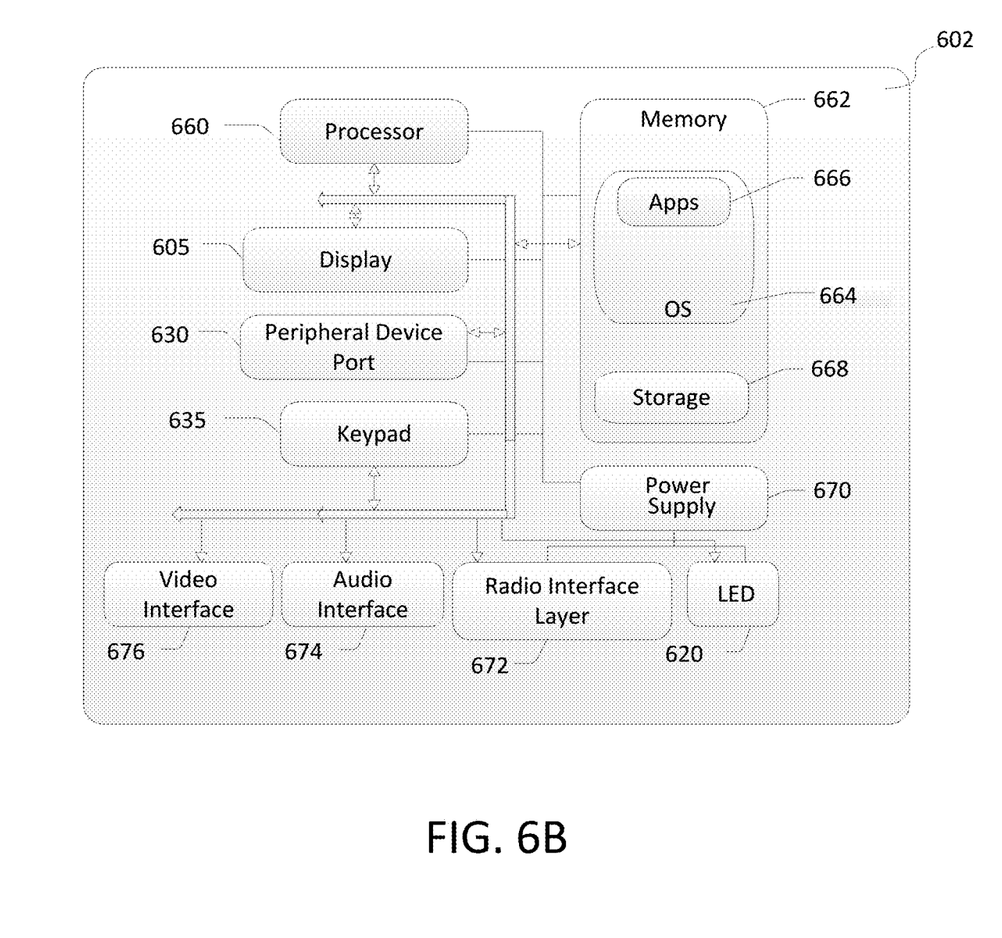
Figure 7:
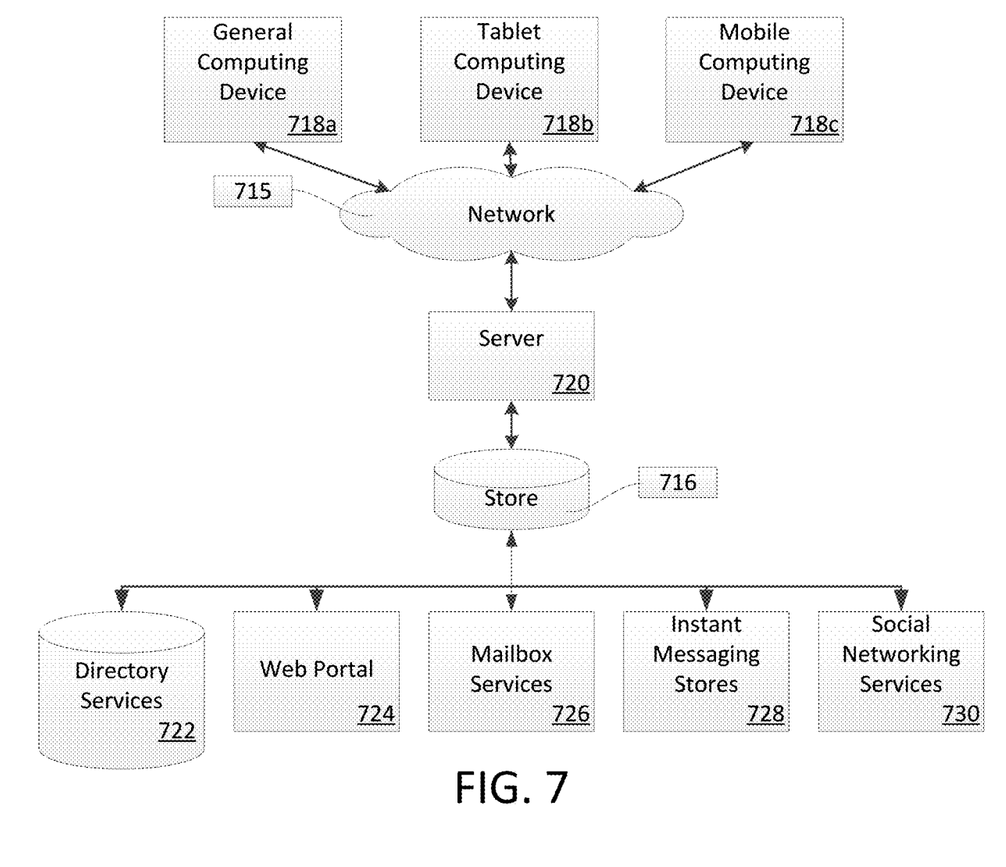
FIG. 7 is a simplified block diagram of a distributed computing system in which aspects of the present disclosure may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing examples of the invention, described herein.

FIG. 5 is a block diagram illustrating physical components of a computing device 502, for example source machine 102 and a target machine 104 as described herein, with which examples of the present disclosure may be practiced. The computing device components described below may be suitable for the computing devices described above. In a basic configuration, the computing device 502 may include at least one processing unit 504 and a system memory 506. Depending on the configuration and type of computing device, the system memory 506 may comprise, but is not limited to, volatile storage (e.g., random access memory), non-volatile storage (e.g., read-only memory), flash memory, or any combination of such memories. The system memory 506 may include an operating system 507 and one or more program modules 508 suitable for running software applications 520 such as application for data replication 528, 10 manager 524, and other utility 526. The operating system 507, for example, may be suitable for controlling the operation of the computing device 502. Furthermore, examples of the invention may be practiced in conjunction with a graphics library, other operating systems, or any other application program and is not limited to any particular application or system. This basic configuration is illustrated in FIG. 5 by those components within a dashed line 522. The computing device 502 may have additional features or functionality. For example, the computing device 502 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 506. While executing on the processing unit 504, the program modules 508 (e.g., application 528, Input/Output (I/O) manager 524, and other utility 526) may perform processes including, but not limited to, one or more of the stages of the operational flow 400 illustrated in FIG. 4, for example. Other program modules that may be used in accordance with examples of the present invention may include electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 502 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 504 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 506, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 502. Any such computer storage media may be part of the computing device 502. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which examples of the invention may be practiced. For example, mobile computing device 600 may be used to implement source 102 and target 108. With reference to FIG. 6A, one example of a mobile computing device 600 for implementing the examples is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one examples, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including application for data replication 528, IO manager 524, and other utility 526 described herein.

The system 602 has a power supply 670, which may be implemented as one or more batteries. The power supply 670 might further include an external power source, such as an AC adapter or a powered docking cradle that supplements or recharges the batteries.

The system 602 may include peripheral device port 678 that performs the function of facilitating connectivity between system 602 and one or more peripheral devices. Transmissions to and from the peripheral device port 672 are conducted under control of the operating system 664. In other words, communications received by the peripheral device port 678 may be disseminated to the application programs 666 via the operating system 664, and vice versa.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with examples of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing an application that reliably accesses target data on a storage system and handles communication failures to one or more client devices, as described above. Target data accessed, interacted with, or edited in association with application 528, IO manager 524, other utility 526, and storage (e.g., storage 104 and storage 110) may be stored in different communication channels or other storage types. For example, various documents may be stored using a directory service 722, a web portal 724, a mailbox service 726, an instant messaging store 728, or a social networking site 730. Application 528, IO manager 524, other utility 526, and storage systems may use any of these types of systems or the like for enabling data utilization, as described herein. A server 720 may provide storage system for use by a client operating on general computing device 502 and mobile device(s) 600 through network 715. By way of example, network 715 may comprise the Internet or any other type of local or wide area network, and client nodes may be implemented as a computing device 502 embodied in a personal computer, a tablet computing device, and/or by a mobile computing device 600 (e.g., a smart phone). Any of these examples of the client computing device 502 or 600 may obtain content from the store 716.

Examples of the present disclosure describe implementing bitmap-based replication when synchronization is lost between a source device and a target device. According to one example, a temporal identifier may be received from the target device. If the source device determines that a primary replication method is unable to be used to replicate data associated with the temporal identifier, a secondary replication method may be initiated. The secondary replication method may utilize a recovery bitmap identifying data blocks that have changed on the source device since a previous event.

In one example, a starting LSN and an ending LSN may be tagged in the recovery bitmap to track replication of the data blocks that have changed on the source device since the previous event. Creation of the recovery bitmap may comprise propagating bitmap data throughout a hierarchical bitmap structure maintained on behalf of the target device. The recovery bitmap may comprise an accumulation of data indicated by the hierarchical bitmap structure. In addition to the recovery bitmap, the hierarchical bitmap structure may include a checkpoint bitmap corresponding to data records in a current virtual log file, and an accumulating bitmap corresponding to data records in multiple log files. Data may be propagated from the checkpoint bitmap to the accumulating bitmap when a current log file represented by the checkpoint bitmap is full. Data may be propagated from the accumulating bitmap to the recovery bitmap upon determining that the primary replication method is unable to be used to replicate data associated with the temporal identifier. The initiation of the secondary replication method may further include sending the recovery bitmap to the target device.

In an example, the primary replication method is a log-based replication method, the temporal identifier is an LSN, and the previous event is a previous replication of data to the target device through a transaction indicated by the LSN. In another example, the recovery bitmap may identify a LSN corresponding to a most recent data change represented by the recovery bitmap. That is, the source device may receive a second LSN from the target device. Based on receipt of the second LSN, the source device may determine if the accumulating bitmap for the target device is empty. When the accumulating bitmap for the target device is empty, the source device may provide replication data to the target device using a primary replication method such as log-based replication. When the accumulating bitmap for the target is not empty, data may be propagated from the accumulating bitmap to the recovery bitmap to be sent from the recovery bitmap to the target device.

In addition to examples where the source device manages replication data for a single target device, the source device may manage replication of data to a plurality of target devices. The source device may create and maintain a separate recovery bitmap for each of the plurality of target devices.

In an example where a data change occurs on the source device, a new bit in the recovery bitmap may be set when a new update is made on the source device. As an example, the new bit may equate to a range of storage of the source device in which the change has occurred.

Further examples of the present disclosure describe receiving an LSN from a target device and determining whether a log-based replication method is able to replicate data associated with the LSN. If the log-based replication method is unable to replicate data associated with the LSN, a source device may initiate replication of data using a bitmap-based replication method. The bitmap-based replication method utilizes a recovery bitmap identifying data blocks that have changed on a source device since recordation of a previous event. Initiation of the bitmap-based recovery method may include propagating bitmap data through a target-specific bitmap structure including the recovery bitmap. The target-specific bitmap structure may also include a checkpoint bitmap corresponding to data records in a current virtual log file, and an accumulating bitmap corresponding to data records in multiple log files. Bits of data may be transmitted from the recovery bitmap to the target device for replication, where each bit of data equates to a range of disk data from the source device in which a change has occurred since a previous replication to the target device. Once data associated with the LSN has been processed by the target device, the target device may send a second LSN to the source device. Based on receipt of the second LSN, the source device may determine if the accumulating bitmap for the target device is empty. When the accumulating bitmap for the target device is empty, the source device may provide replication data to the target device using the bitmap-based replication method. When the accumulating bitmap for the target is not empty, data may be propagated from the accumulating bitmap to the recovery bitmap and the data of the recovery bitmap may be sent to the target device.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While example examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   maintaining at a source device a plurality of target-specific hierarchical bitmap structures for a plurality of target devices, wherein each of the target-specific hierarchical bitmap structures comprises a recovery bitmap and an accumulating bitmap for one of the plurality of target devices, the accumulating bitmap corresponding to data records in a previous virtual log;
   receiving a temporal identifier from a first target device of the plurality of target devices;
   determining that a primary replication method is unable to be used to replicate data associated with the temporal identifier for the first target device; and
   initiating replication of data for the first target device using a secondary replication method, wherein the secondary replication method utilizes a recovery bitmap for the first target device that identifies data blocks that have changed on the source device since a previous replication of data to the first target device through a transaction indicated by the temporal identifier.

2. The method according to claim 1, further comprising:
   switching back to the primary replication method for the first target device upon receiving an indication that the first target device is sufficiently synchronized with the source device.

3. The method according to claim 1, wherein the initiating further comprises sending the recovery bitmap for the first target device to the first target device.

4. The method according to claim 3, wherein the primary replication method is a log-based replication method and the temporal identifier is a log sequence number.

5. The method according to claim 1, wherein creating the recovery bitmap comprises creating the recovery bitmap by propagating bitmap data throughout a target-specific hierarchical bitmap structure maintained for the first target device.

6. The method of claim 1, wherein the each of the target-specific hierarchical bitmap structures further comprises a checkpoint bitmap, the checkpoint bitmap corresponding to data records in a current virtual log.

7. The method according to claim 6, further comprising:
   propagating data from the checkpoint bitmap to the accumulating bitmap when the current virtual log represented by the checkpoint bitmap is full.

8. The method according to claim 7, further comprising:
   propagating data from the accumulating bitmap to the recovery bitmap when it is determined that the primary replication method is unable to be used to replicate data associated with the temporal identifier.

9. The method according to claim 1, wherein the recovery bitmap identifies a second temporal identifier corresponding to a most recent data change represented by the recovery bitmap for the first target device.

10. The method according to claim 1, further comprising:
setting a new bit in the recovery bitmap for the first target device when a new update is made on a source device, wherein the new bit equates to a range of storage of the source device in which a change has occurred.

11. The method according to claim 1, further comprising:
receiving a second temporal identifier from the first target device;
determining if the accumulating bitmap for the first target device is empty;
when the accumulating bitmap for the first target device is empty, providing replication to the first target device using the primary replication method; and
when the accumulating bitmap for the first target device is not empty, propagating data from the accumulating bitmap to the recovery bitmap and sending the recovery bitmap to the first target device.

12. The method of claim 1 comprising:
receiving a second temporal identifier from a second target device of the plurality of target devices;
determining that a primary replication method is unable to be used to replicate data associated with the second temporal identifier to the second target device; and
initiating replication of data to the second target device using a secondary replication method, wherein the secondary replication method utilizes a target-specific recovery bitmap for the second target device, wherein the target-specific recovery bitmap identifies data blocks that have changed since a previous replication of data to the second target device through a transaction indicated by the second temporal identifier.

13. A data replication system comprising:
a processor; and
memory storing computer readable instructions that when executed by the processor cause the system to:
maintain a plurality of target-specific hierarchical bitmap structures, wherein each of the plurality of target-specific hierarchical bitmap structures comprises a recovery bitmap and an accumulating bitmap for a target device, the accumulating bitmap corresponding to data records in a previous virtual log;
receive a first temporal identifier from a first target device;
determine that a primary replication method is unable to be used to replicate data associated with the first temporal identifier; and
initiate replication of data to the first target device using a secondary replication method, wherein the secondary replication method utilizes a recovery bitmap for the first target device that identifies data blocks that have changed since a previous replication of data to the first target device through a transaction indicated by the first temporal identifier.

14. The data replication system of claim 13, wherein the computer readable instructions, when executed, further cause the system to:
based on the determination that the primary replication method is unable to be used to replicate data associated with the temporal identifier, propagate data from the accumulating bitmap to the recovery bitmap;
receive a second temporal identifier from the first target device;
determine if the accumulating bitmap for the first target device is empty;
when the accumulating bitmap for the first target device is empty, providing replication to the first target device using the primary replication method; and
when the accumulating bitmap for the first target device is not empty, propagating data from the accumulating bitmap to the recovery bitmap and sending the recovery bitmap to the target device.

15. The data replication system of claim 13 further comprising computer readable instructions stored on the memory that when executed by the processor cause the system to:
receive a second temporal identifier from a second target device;
determine that a primary replication method is unable to be used to replicate data associated with the second temporal identifier; and
initiate replication of data to the second target device using a secondary replication method, wherein the secondary replication method utilizes a recovery bitmap for the second target device that identifies data blocks that have changed since the second temporal identifier.

16. A method for data replication from a source device to a plurality of target devices, the method comprising:
maintaining at the source device a target-specific hierarchical bitmap structure for each of the plurality of target devices, wherein the plurality of target devices comprises a first target device and a second target device and each of the target-specific hierarchical bitmap structures comprises a checkpoint bitmap, an accumulating bitmap, and a recovery bitmap;
storing in the checkpoint bitmap for the first target device a compilation of disc blocks of the source device that have been affected by transactions represented in a current virtual log;
propagating data from the checkpoint bitmap to the accumulating bitmap for the first target device when the current virtual log is full;
receiving a first log sequence number (LSN) from the first target device;
determining that a log-based replication method is unable to be used to replicate data associated with the LSN for the first target device;
propagating data from the accumulating bitmap to the recovery bitmap for the first target device when it is determined that the log-based replication method is unable to be used to replicate data associated with the first LSN for the first target device;
initiating replication of data to the first target device using a bitmap-based replication method, wherein the bitmap-based replication method utilizes the recovery bitmap to identify data blocks that have changed on the source device since a previous event;
receiving a second log sequence number (LSN) from the second target device; and
determining that a log-based replication method may be used to replicate data associated with the second LSN for the second target device.

17. The method according to claim 16, further comprising:
when the accumulating bitmap for the first target device is empty, providing replication to the first target device using the bitmap-based replication method.

* * * * *